UNITED STATES PATENT OFFICE.

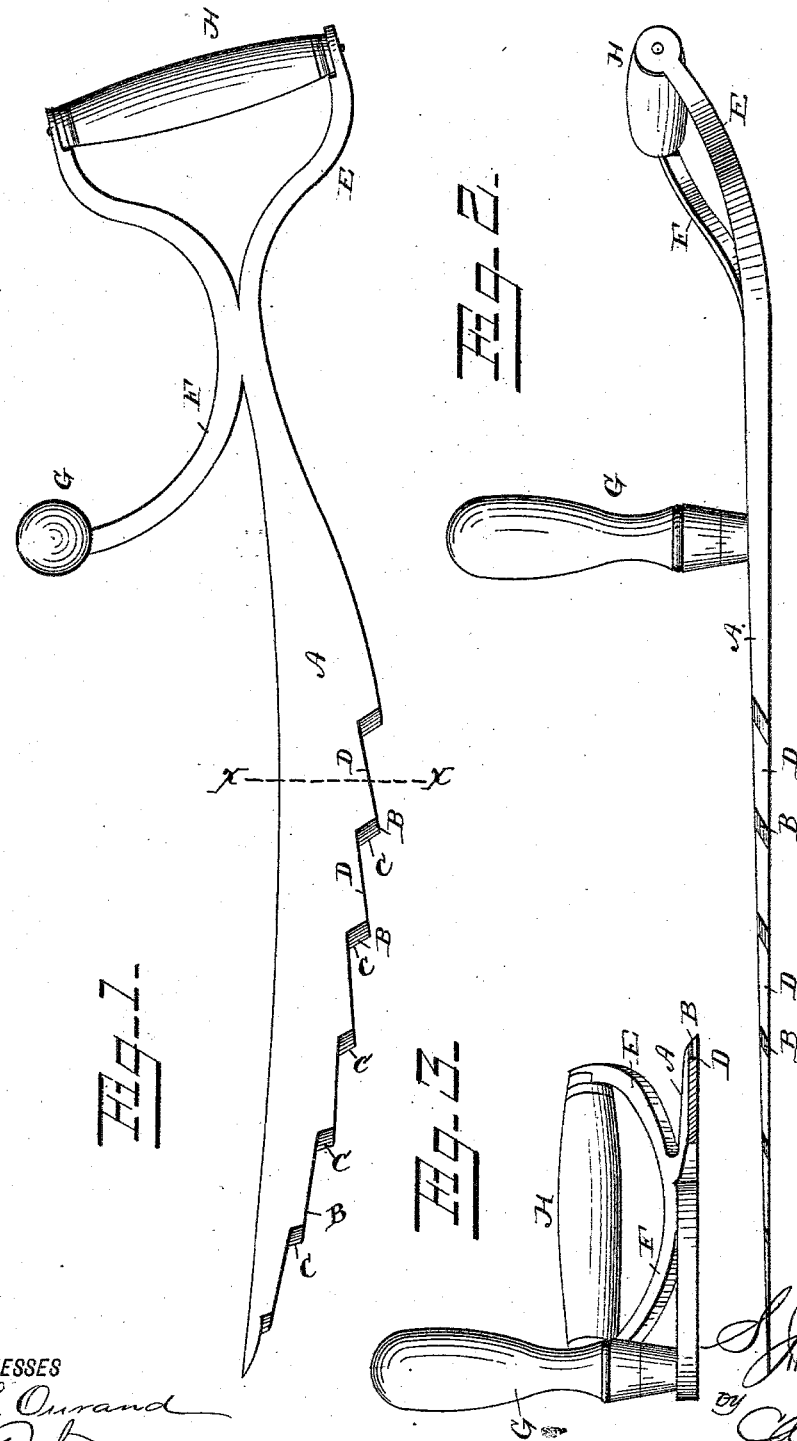

SANFORD J. BAKER, OF OAKLAND, MAINE.

HAY-KNIFE.

SPECIFICATION forming part of Letters Patent No. 288,198, dated November 13, 1883.

Application filed May 24, 1883. (No model.)

*To all whom it may concern:*

Be it known that I, SANFORD J. BAKER, a citizen of the United States, residing at Oakland, in the county of Kennebec and State of Maine, have invented a new and useful Hay-Knife, of which the following is a specification, reference being had to the accompanying drawings.

This invention relates to hay knives or cutters; and it consists in certain improvements in the construction of the same, which will be hereinafter fully described, and particularly pointed out in the claim.

In the drawings hereto annexed, Figure 1 is a side view. Fig. 2 is an edge view, and Fig. 3 is a transverse sectional view on the line $x$ $x$ in Fig. 1.

The same letters refer to the same parts in all the figures.

A in the drawings represents the blade of my improved hay-knife, which is slightly curved, as shown, in transverse section. The said blade is of equal thickness through its body, but longitudinally it tapers or grows thinner from the rear end to its point. The outer or convex edge of the blade A is provided with a series of teeth or serrations, B B, the front or cutting edges of which, C, are inclined in a rearward direction, or toward the handle end of the knife. The said cutting-edges form oblique angles with the sides D of the teeth, which are straight, as shown. The rear end of the blade A is bent outwardly and upwardly, as at E, and to the side of the said blade, near its rear end, is secured a horseshoe-shaped bail, F, between the rear end of which and the rear end of the knife-blade a handle, H, is secured. The front end of the bail F is bent outwardly, and to it a handle, G, is secured at right angles to the handle H.

The operation and advantages of my improved hay-knife will be readily understood from the foregoing description, taken in connection with the drawings hereto annexed. It is simple, durable, and easily manipulated. The handles are strong and substantial, so that they will readily withstand the strain to which they will be subjected.

I claim as my invention and desire to secure by Letters Patent of the United States—

In a hay knife or cutter, the blade having an outwardly and upwardly curved rear end, and provided on its convex side with a horseshoe-shaped bail having outturned front end, in combination with the handles secured to the said outturned front end of the bail, and between the rear ends of the latter and the blade, as set forth.

In testimony that I claim the foregoing as my own I have hereto affixed my signature in presence of two witnesses.

SANFORD J. BAKER.

Witnesses:
WATSON V. LEONARD,
GEO. H. BRYANT.